(12) United States Patent
Ichimaru

(10) Patent No.: US 7,156,629 B2
(45) Date of Patent: Jan. 2, 2007

(54) PIPING STRUCTURE IN TIRE VULCANIZING MACHINE

(75) Inventor: Hironobu Ichimaru, Chikugo (JP)

(73) Assignee: Ichimaru Giken Co., Ltd., Chikugo (JP)

( * ) Notice: Subject to any disclaimer, the term of this patent is extended or adjusted under 35 U.S.C. 154(b) by 0 days.

(21) Appl. No.: 10/520,835

(22) PCT Filed: Jul. 8, 2003

(86) PCT No.: PCT/JP03/08678

§ 371 (c)(1),
(2), (4) Date: Jan. 6, 2005

(87) PCT Pub. No.: WO2004/018175

PCT Pub. Date: Mar. 4, 2004

(65) Prior Publication Data

US 2005/0233017 A1  Oct. 20, 2005

(30) Foreign Application Priority Data

Jul. 9, 2002 (JP) ............................. 2002-199951

(51) Int. Cl.
*B29C 35/04* (2006.01)
(52) U.S. Cl. .......................................... 425/42; 425/43
(58) Field of Classification Search .................. 425/42, 425/43, 44; 264/315
See application file for complete search history.

(56) References Cited

U.S. PATENT DOCUMENTS

| | | | | |
|---|---|---|---|---|
| 3,002,228 A | * | 10/1961 | Salem et al. ................ | 264/315 |
| 3,579,626 A | * | 5/1971 | Brittain ...................... | 264/315 |
| 4,222,721 A | * | 9/1980 | Gado ......................... | 264/315 |
| 4,370,283 A | * | 1/1983 | Arimatsu et al. ........... | 264/315 |
| 4,382,052 A | * | 5/1983 | Arimatsu .................... | 264/315 |
| 4,406,845 A | * | 9/1983 | Sakon et al. ................ | 264/315 |
| 5,238,643 A | | 8/1993 | Kobayashi | |

FOREIGN PATENT DOCUMENTS

| | | |
|---|---|---|
| JP | 03-215010 | 9/1991 |
| JP | 6-78690 | 11/1994 |
| JP | 11-2384 | 1/1999 |

* cited by examiner

*Primary Examiner*—James P. Mackey
(74) *Attorney, Agent, or Firm*—Flynn, Thiel, Boutell & Tanis, P.C.

(57) ABSTRACT

The invention relates to a piping structure in a tire vulcanizing machine which has a simple structure, has an improved operability of a valve, can easily execute a maintenance work such as a valve replacement or the like, and can form a compact valve unit. A plurality of panel valves 5 are attached to a block main body side by side in a vertical direction in a state of flush connecting a block side connection surface 34 formed approximately perpendicularly in a block main body 30 which is long in a vertical direction, and a valve side connection surface 56 formed approximately perpendicularly in one side of an outer surface of a valve main body 50, and main flow paths 31, 32 formed in an inner portion of the block main body and flow paths 51, 52 formed in an inner portion of each of the panel valves are connected.

1 Claim, 3 Drawing Sheets

PIPING STRUCTURE IN TIRE VULCANIZING MACHINE

BACKGROUND OF THE INVENTION

1. Technical Field

The present invention relates to a piping structure for supplying and discharging a fluid to a bladder provided in a tire vulcanizing machine.

2. Description of the Related Art

The tire vulcanizing machine is provided with upper and lower metal molds and a bladder which expands and contracts by supplying and discharging a fluid, and is structured such as to vulcanize a raw tire by pressing the bladder expanded by supplying the fluid to an inner surface of the raw tire which is set to an inner portion of the metal molds.

A main pipe is connected to an inner portion of the bladder, and a plurality of branch pipes (a steam supply pipe, a gas supply pipe, a shaving gas supply pipe, a gas recovery pipe, an exhaust pipe and the like) are connected to the main pipe via a plurality of valves.

As mentioned above, a plurality of branch pipes are connected to the main pipe via a plurality of valves, respectively.

Conventionally, the piping structure of each of the valves and each of the branch pipes with respect to the main pipe employs a two-way, three-way or four-way switch valve having a flange or an inside screw and an outside screw, and a valve unit is formed by assembling them in one position.

In the case that the valve unit is formed in the manner mentioned above, it is possible to intend an effective utilization of a space, however, in the conventional structure, when connecting each of the valves and the branch pipes to the main pipe, the structure is made such that the pipe is processed in an optional shape such as thread cutting the pipe and welding the flange, and the valve unit is finally formed by combining a lot of these pipes and valves.

Accordingly, in the conventional structure, the piping structure becomes complicated and constrained by a lot of pipes and flanges, so that there are problems that a lot of labor is required for keeping the pipes warm and a lot of labor is required for replacing the valves for maintenance. Further, in the case of securing an area for operating and maintaining the valves, there is a problem that the valve unit is enlarged in size.

Further, since a lot of pipes are complexly placed and the pipes are arranged approximately horizontally, there is also a problem that a drain is hard to beget out from the pipes due to an accumulation of the drain.

The present invention is made for the purpose of solving the conventional problems mentioned above, and an object of the present invention is to provide a piping structure in a tire vulcanizing machine which has a simple structure and an improved operability of a valve, can easily execute a maintenance work such as a valve replacement, and can form a compact valve unit having a reduced piping area.

SUMMARY OF THE INVENTION

In order to achieve the object mentioned above, in accordance with a first aspect of the present invention, there is provided a piping structure in a tire vulcanizing machine comprising: upper and lower metal molds; a bladder expanded and contracted by supplying and discharging the fluid; and the bladder expanded by supplying the fluid being pressed to an inner surface of the raw tire which is set to an inner portion of the metal molds. The piping structure comprises: a panel block in which a main flow path connected to a main pipe connected to an inner portion of the bladder, and a plurality of auxiliary flow paths connected to a plurality of branch pipes are formed in an inner portion of a block main body; and a plurality of panel valves in which a valve body for opening and closing a valve port is provided in an inner portion of the valve main body, an inflow path and an outflow path are communicated in an open state of the valve port by the valve body, and the inflow path and the outflow path are communicated and shut off by opening and closing the valve port by means of the valve body. The block main body of the panel block is formed long in a vertical direction, and a block side connection surface is approximately perpendicularly formed in a side surface thereof. A valve side connection surface is approximately perpendicularly formed in one side of an outer surface of the valve main body, and a plurality of panel valves are attached to the block main body side by side in a vertical direction in a state in which the valve side connection surface is connected face to face to the block side connection surface, wherein in each of the panel valve mounting portions, a first outflow port from a first inflow port and the outflow path to the inflow path is formed in the valve side connection surface of the panel valve, a second outflow port from a second inflow port and the auxiliary flow path to the main flow path is formed in the block side connection surface of the panel block, and the valve side connection surface and the block side connection surface are connected face to face in a state where the first inflow port and the second outflow port are matched and the second inflow port and the first outflow port are matched, and wherein a plurality of panel valves include a steam supply valve, a gas supply valve, a shaving gas supply valve, a gas recovery valve, an exhaust valve and the like, and the exhaust valve is arranged at a lowest position.

BEST MODE FOR CARRYING OUT THE INVENTION

Figure 1:
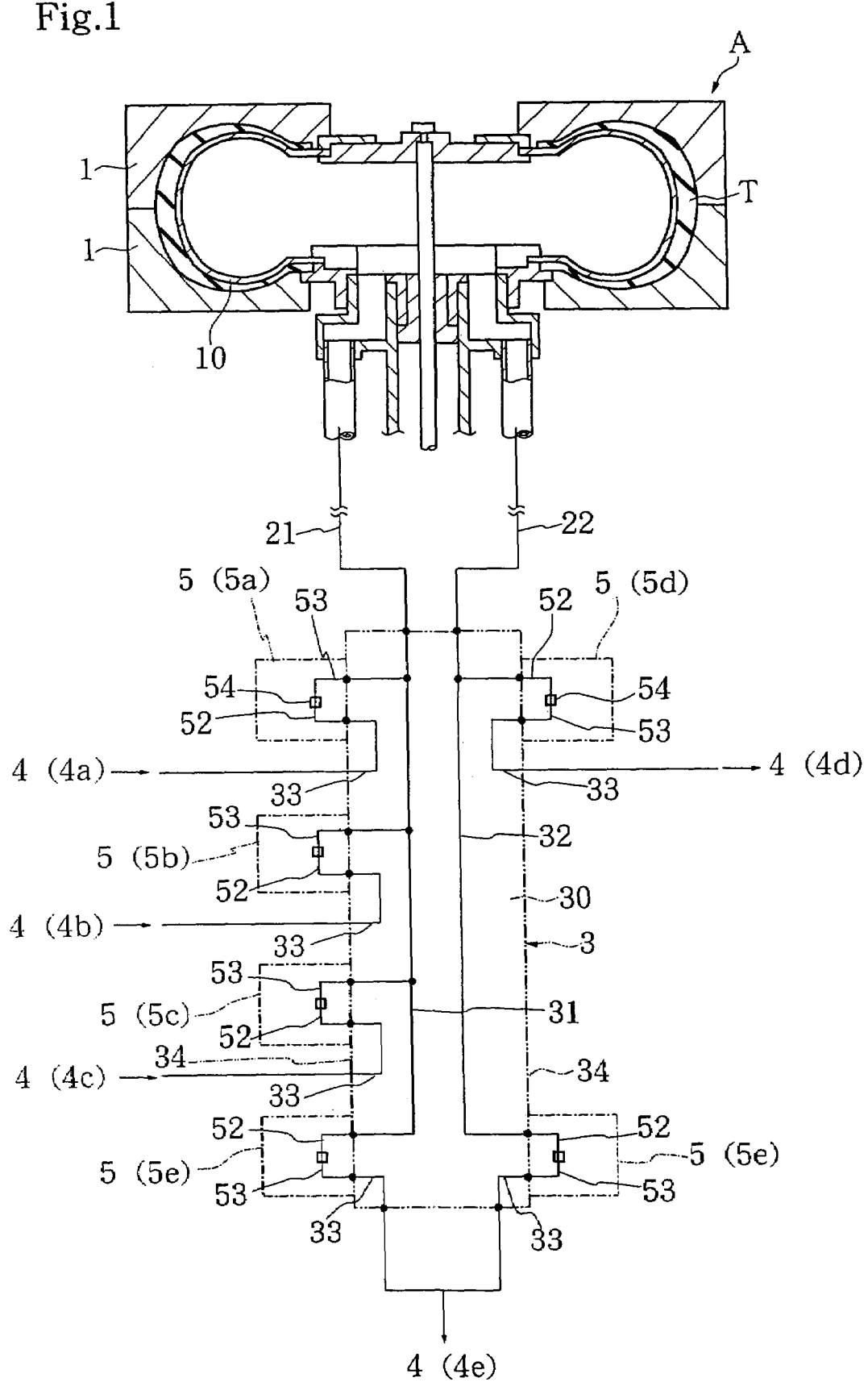
FIG. 1 is a schematic view of a piping structure in a tire vulcanizing machine in accordance with an embodiment of the present invention.

A description will be given below of a mode for carrying out the present invention on the basis of an embodiment shown in the drawings.

Figure 2:
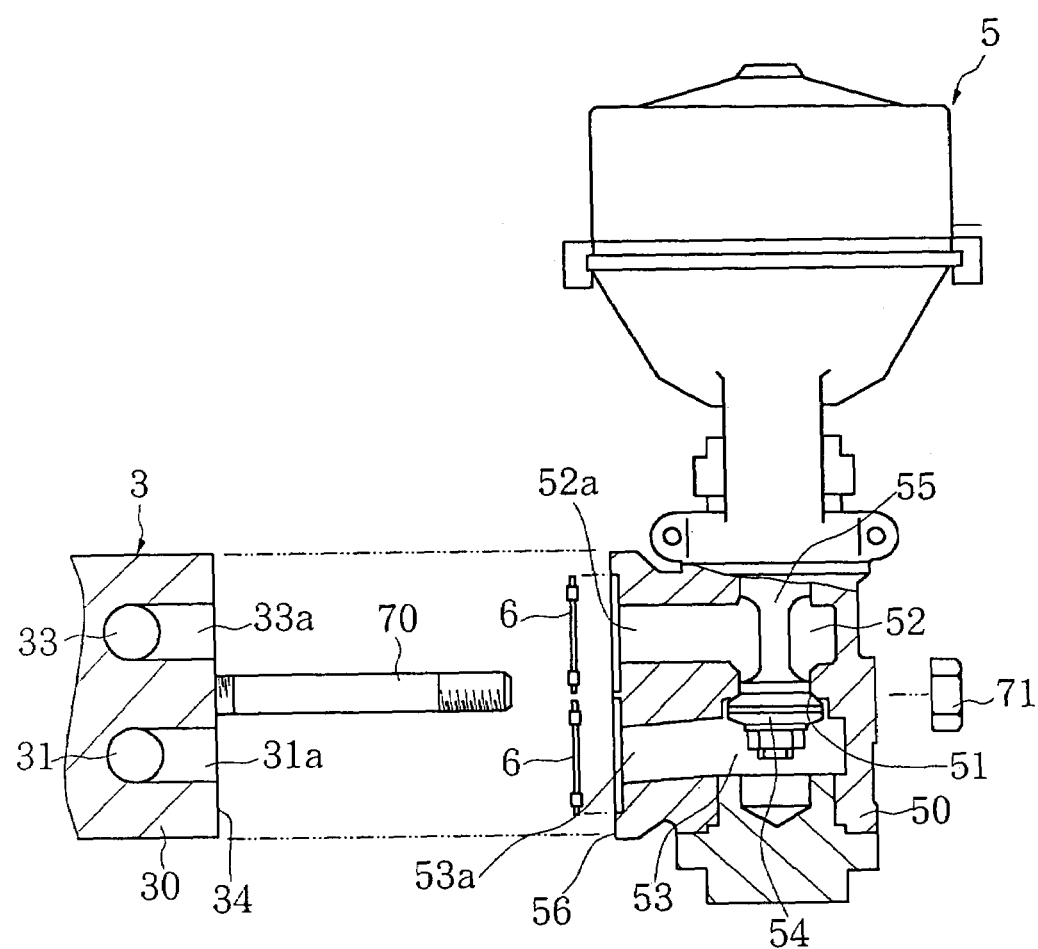
FIG. 2 is a plan view of a notched cross section showing a mounting structure of a panel valve in the piping structure.
Figure 3:
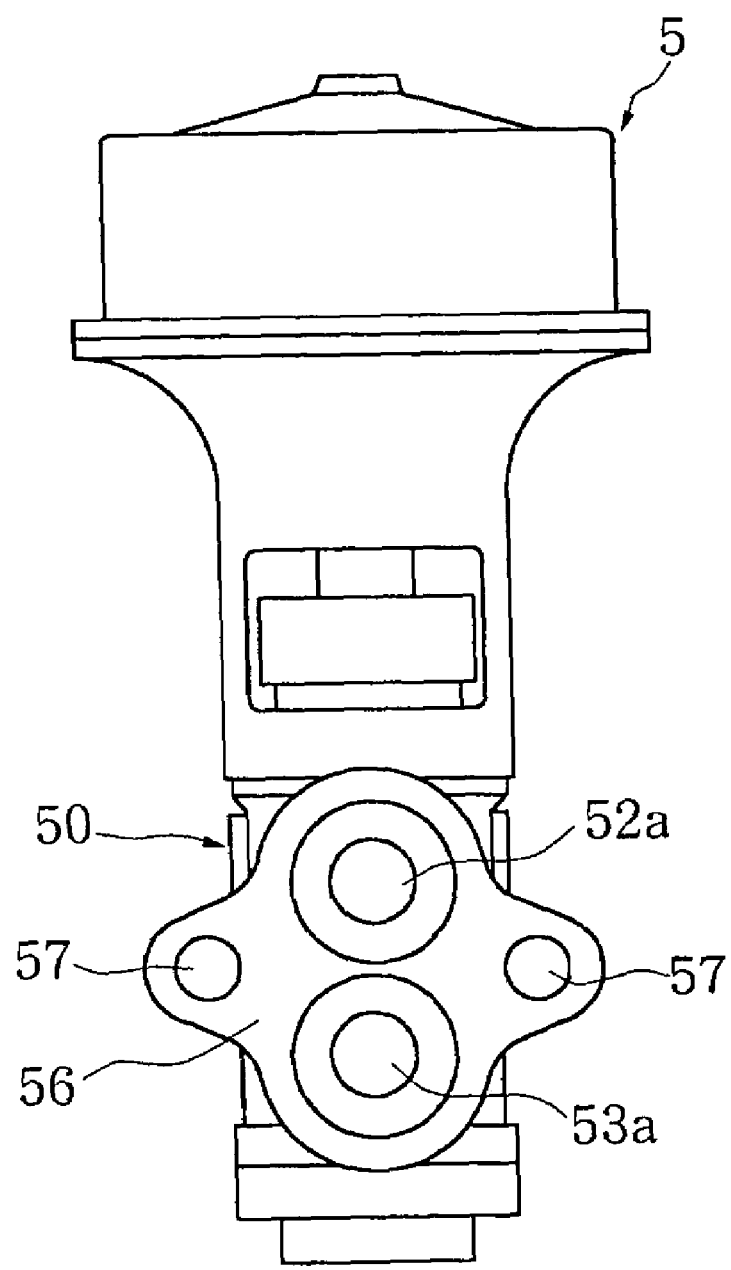
FIG. 3 is a side elevational view of the panel valve.

FIG. 1 is a schematic view of a piping structure in a tire vulcanizing machine in accordance with an embodiment of the present invention, FIG. 2 is a plan view of a notched cross section showing a mounting structure of a panel valve in the piping structure, and FIG. 3 is a side elevational view of the panel valve.

A tire vulcanizing machine A is provided with upper and lower metal molds 1 and 1, and a bladder 10 which expands and contracts by the supply and discharge of a heated fluid, and is structured such as to vulcanize a raw tire T while holding it, by pressing the bladder 10, expanded by the supply of the fluid, to an inner surface of the raw tire T set in inner portions of the metal molds 1 and 1.

A fluid supply pipe 21 (a main pipe) and a fluid discharge pipe 22 (a main pipe) are connected to an inner portion of the bladder 10, and the fluid supply pipe 21 and the fluid discharge pipe 22 are connected to a fluid supply flow path 31 (a main flow path) and a fluid discharge flow path 32 (a main flow path) which are formed in an inner portion of a block main body 30 of a panel block 3.

In addition to the fluid supply flow path 31 and the fluid discharge flow path 32 which serve the main flow path, a plurality of auxiliary flow paths 33 connected to a plurality of branch pipes 4 (a steam supply pipe 4a, a gas supply pipe 4b, a shaving gas supply pipe 4c, a gas recovery pipe 4d and an exhaust pipe 4e) are formed in the inner portion of the block main body 30.

Further, the block main body 30 of the panel block 3 is formed long in a vertical direction (a direction of a front and back of the paper surface in FIG. 2), a block side connection surface 34 is approximately perpendicularly formed in a side surface thereof, and a plurality of panel valves 5 corresponding to the respective branch pipes 4 are attached to the block side connection surface 34 side by side in a vertical direction.

In this case, a plurality of panel valves 5 include a steam supply valve 5a, a gas supply valve 5b, a shaving gas supply valve 5c, a gas recovery valve 5d and an exhaust valve 5e, and the exhaust valve 5e is arranged at a lowest position.

The panel valve 5 is formed, as shown in FIG. 2, such that an inflow path 52 and an outflow path 53, communicated by a valve port 51, are formed in an inner portion of a valve main body 50, the inflow path 52 and the outflow path 53 communicate in an open state of the valve port 51 provided in a valve body 54, and the inflow path 52 and the outflow path 53 are shut off in a closed state (a state shown in FIG. 2) of the valve port 51 by the valve body 54.

In this case, the valve body 54 is structured as a direct acting type piston valve which is attached to a leading end of a valve stem 55, reciprocates vertically in accordance with a reciprocating motion of a piston (not shown) attached to an upper end of the valve stem 55, and opens and closes the valve port 51.

A valve side connection surface 56 is approximately perpendicularly formed in one side of an outer surface of the valve main body 50, and the plurality of panel valves 5 are attached to the block main body 30 side by side in a vertical direction in a state in which the valve side connection surface 56 is connected face to face to the block side connection surface 34.

In this case, in the mounting portion of each of the panel valves 5, a first inflow port 52a to the inflow path 52 and a first outflow port 53a from the outflow path 53 are formed in the valve side connection surface 56 of the panel valve 5.

On the other hand, a second inflow path 31a to the fluid supply flow path 31 or the fluid discharge flow path 32 and a second outflow port 33a from the auxiliary flow path 33 are formed in the block side connection surface 34 of the panel block 3.

Further, the valve side connection surface 56 and the block side connection surface 34 are connected face to face via a gasket packing 6 in a state in which the first inflow port 52a and the second outflow port 33a are matched, and the second inflow port 31a and the first outflow port 53a are matched.

In this case, a stud bolt 70 is attached to the block side connection surface 34, and a valve mounting structure is formed by inserting the stud bolt 70 to a bolt mounting through hole 57 passing through the valve main body 50 from the valve side connection surface 56, and fastening a leading end thereof by a nut 71.

Accordingly, in the piping structure in accordance with the present embodiment, since the fluid supply flow path 31 and the fluid discharge flow path 32 which serve as the main flow path are formed in the inner portion of the block main body 30 formed long in the vertical direction, the pipes can be reduced at that degree, and a compact valve unit can be formed on the basis of a simple structure.

Further, since a plurality of panel valves 5 are arranged side by side in the vertical direction in the block side connection surface 34 formed in the side surface of the block main body 30, it is possible to operate each of the panel valves 5 from one side, so that it is possible to improve an operability and to easily execute a maintenance work such as a valve replacement or the like.

Further, since the fluid supply flow path 31 and the fluid discharge flow path 32 which serve as the main flow path are formed in the inner portion of the block main body 30 formed long in the vertical direction, the drain easily flows downward. In the case that the exhaust valve 5e in a plurality of panel valves 5 is arranged at the lowest position as in the embodiment, it is also possible to discharge the drain flowing down to the lower end of the main flow path at a stroke, thus the time required for discharging the drain can be shorten, so that a cycle time for vulcanizing the tire can be shorten.

In this case, in the embodiment mentioned above, the number of the block main body 30 of the panel block 3 is set to one, and the fluid supply flow path 31 and the fluid discharge flow path 32 which serve as the main flow path are formed in the block main body 30, however, the structure may be made such that the number of the block main body is set to two, the fluid supply flow path serving as the main flow path is formed in one block main body, and the fluid discharge flow path serving as the main flow path is formed in the other block main body.

Further, a plurality of panel valves are not limited to five valves mentioned above (the steam supply valve, the gas supply valve, the shaving gas supply valve, the gas recovery valve and the exhaust valve), and include the other fluid supplying valves and the discharge valves for the other purposes to attach to the apparatus.

INDUSTRIAL APPLICABILITY

As described above, in accordance with the piping structure of the present invention (the first aspect), since the piping structure employs the panel block in which the block main body is formed long in the vertical direction, and a plurality of panel valves are attached to the block main body of the panel block side by side in the vertical direction, it is possible to assemble in a simple structure, and it is possible to form in a compact valve unit.

Furthermore, it is possible to improve an operability of the valve, and it is possible to easily execute the maintenance work such as the valve replacement and the like.

Further, since the main flow path is formed in the inner portion of the block main body formed long in the vertical direction, the drain easily flows down. In particular, in the case of arranging the panel valve connected to the exhaust pipe via the auxiliary flow path in a plurality of panel valves, it is possible to discharge the drain flowing down to the lower end of the main flow path at a stroke, and it is possible to shorten the time required for discharging the drain.

What is claimed is:

1. A piping structure in a tire vulcanizing machine having upper and lower molds and a bladder which expands and contracts by the supply and discharge of a fluid, the piping structure comprising:

a panel block comprising a block main body which extends longitudinally in a vertical direction and has a block side connection surface at a side surface thereof, wherein a main flow path and a plurality of auxiliary flow paths are formed in an inner portion of the block main body, the main flow path being connected to a main pipe which is connected to an inner portion of the bladder and the auxiliary flow paths being connected to a plurality of branch pipes; and a plurality of panel valves, each panel valve comprising a valve main body which includes an inflow path, an outflow path, a valve port, a valve body for opening and closing the valve port to selectively communicate the inflow path with the outflow path and isolate the inflow path from the outflow path, the valve main body having a valve side connection surface at one side of an outer surface thereof, wherein the valve side connection surface of each panel valve includes a first inflow port communicating with the inflow path and a first outflow port communicating with the outflow path, and the block side connection surface of the block main body includes a plurality of second outflow ports and a plurality of second inflow ports communicating with either the main flow path or a respective one of the auxiliary flow paths, the plurality of panel valves are each attached to the block main body side-by-side in a vertical direction by connecting the respective valve side connection surface and the block side connection surface in a face-to-face connection such that the respective first inflow port and one of the second outflow ports are matched, and the plurality of panel valves include a steam supply valve, a gas supply valve, a shaving gas supply valve, a gas recovery valve and an exhaust valve, the exhaust valve being provided a lowest position on the block main body of the panel block with respect to the plurality of panel valves.

* * * * *